United States Patent
Chiu et al.

(10) Patent No.: US 7,980,749 B2
(45) Date of Patent: Jul. 19, 2011

(54) BACKLIGHT MODULE WITH INTEGRATED BASE AND METHOD OF MANUFACTURING THEREOF

(75) Inventors: Lin-Wei Chiu, Hsin-Chu (TW); Kuo-Kang Tseng, Hsin-Chu (TW); Hong-Ming Chen, Hsin-Chu (TW); Chih-Kang Tung, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 293 days.

(21) Appl. No.: 12/391,290

(22) Filed: Feb. 24, 2009

(65) Prior Publication Data

US 2009/0237945 A1 Sep. 24, 2009

(30) Foreign Application Priority Data

Mar. 21, 2008 (TW) ................................ 97110037 A

(51) Int. Cl.
*F21V 7/04* (2006.01)
(52) U.S. Cl. ..... 362/632; 362/633; 362/631; 362/217.1; 362/217.11; 362/217.14
(58) Field of Classification Search ................. 362/631, 362/632, 633, 217.1, 217.11–217.17
See application file for complete search history.

(56) References Cited

U.S. PATENT DOCUMENTS

| | | | |
|---|---|---|---|
| 7,517,135 B2* | 4/2009 | Yu | 362/633 |
| 7,719,627 B2* | 5/2010 | Okuda | 349/58 |
| 7,777,829 B2* | 8/2010 | Chung et al. | 349/58 |
| 2008/0112191 A1* | 5/2008 | Wu et al. | 362/634 |
| 2008/0174715 A1* | 7/2008 | Suh et al. | 349/60 |
| 2009/0174838 A1* | 7/2009 | Park et al. | 349/64 |

FOREIGN PATENT DOCUMENTS

CN 1971361 5/2007

OTHER PUBLICATIONS

Chinese language office action dated Oct. 23, 2009.
English language translation of abstract and pertinent parts of CN 1971361 (published May 30, 2007).

* cited by examiner

*Primary Examiner* — Stephen F Husar
*Assistant Examiner* — James W Cranson
(74) *Attorney, Agent, or Firm* — Thomas, Kayden, Horstemeyer & Risley, LLP

(57) ABSTRACT

A backlight module, a base used therein, and a manufacturing method thereof are provided. The backlight module includes a base and a slice-shaped circuit. The base has a back plate including a plate portion and a mezzanine portion. The mezzanine portion is parallelly offset from the plate portion, and the initial position of the mezzanine portion becomes an opening on the plate portion. Because the mezzanine portion is parallelly offset from the plate portion, a containing space is formed between an inner side of the mezzanine portion and the plane of the plate portion. A side of the mezzanine portion and a side of the plate portion corresponding to the opening together form a first slit. The slice-shaped circuit is inserted into the containing space through the first slit and stays between the plate portion and the mezzanine portion.

34 Claims, 16 Drawing Sheets

BACKLIGHT MODULE WITH INTEGRATED BASE AND METHOD OF MANUFACTURING THEREOF

This application claims priority based on a Taiwanese Patent Application No. 097110037, filed on Mar. 21, 2008, the disclosure of which is incorporated herein by reference in its entirety.

BACKGROUND OF THE INVENTION

1. Field of the Invention

The present invention relates to a backlight module, a base used therein, and a manufacturing method thereof. Particularly, the present invention relates to a backlight module with a base having a mezzanine structure, a base used therein, and a manufacturing method thereof.

2. Description of the Related Art

Because liquid crystal display (LCD) panels are thinner, lighter, and more portable as well as having the advantage of lower radiation over cathode ray tube (CRT) displays, the demand for LCD panels increases rapidly in recent years. Particularly, backlight modules are one of the major components of LCD panels. Hence, as the manufacturing technique of LCD devices advances, the backlight modules are accordingly developed to be thinner and brighter at lower cost. In order to maintain the competitiveness of LCD panels in the future market, efforts should be made in the development of backlight modules.

FIG. 1a is a schematic view of a conventional backlight module. As shown in FIG. 1a, the backlight module includes a metal back plate 50, a plastic frame 70, a light source module 20, and optical films 30. The metal back plate 50 is disposed at the bottom of the backlight module, and the plastic frame 70 is disposed on the metal back plate 50 for fixing the light source module 20 and the optical films 30 thereon. The light source module 20 generally includes light emitting diodes (LEDs) or tube lamps. However, while the development tendency of electronic products is lighter, thinner, shorter, and smaller, the backlight modules usually use LEDs as the light source. The optical films 30 include a light guide plate, a brightness enhancement film, or other films capable of adjusting the light outputted from the light source module 20 to meet the design needs.

FIG. 1b is a schematic view showing the rear side of a conventional backlight module. As shown in FIG. 1b, the light source module 20 usually includes circuit components, such as an inverter 21 and a control circuit 23. Generally, the inverter 21 and the control circuit 23 are directly mounted on the rear side of the metal back plate 50 and covered by plates 80, which are provided to protect the inverter 21 and the control circuit and avoid the electric shock. However, the provision of plates 80 increases the number of components as well as the assembly time and the production cost. Moreover, the weight of the entire backlight module will also be increased.

SUMMARY OF THE INVENTION

It is an objective of the present invention to provide a backlight module, a base used therein, and a manufacturing method thereof to reduce the assembly time.

It is another objective of the present invention to provide a backlight module, a base used therein, and a manufacturing method thereof to reduce the production cost.

It is yet another objective of the present invention to provide a backlight module, a base used therein, and a manufacturing method thereof to reduce the weight of the backlight module.

The backlight module of the present invention includes a backlight module base and a slice-shaped circuit. A light source device is disposed on the inner side of the backlight module base. Besides, various optical films or plates can be provided on the light source device for adjusting the output light. The base includes a back plate at the bottom of the backlight module. The back plate includes a plate portion and a mezzanine portion. An opening is formed through the plate portion. The mezzanine portion is parallelly offset from the plate portion to deviate from the plane of the plate portion, so that an initial position of the mezzanine portion becomes the opening on the plate portion. Since the mezzanine portion is parallelly offset from the plate portion, a containing space is formed between an inner side of the mezzanine portion and the plane of the plate portion.

At least one end of the mezzanine portion is connected to the plate portion. For example, two ends of the mezzanine portion are respectively connected to a portion of the plate portion corresponding to two sides of the opening. Because the mezzanine portion projects out from the plate portion, a first slit is formed between a side of the mezzanine portion and a side of the plate portion corresponding to the opening. The first slit communicates with the containing space inside the mezzanine portion. The slice-shaped circuit is inserted into the containing space through the first slit and stays between the plate portion and the mezzanine portion.

The manufacturing method of the backlight module of the present invention includes the following steps. Firstly, a backlight module base is formed to have a back plate. The back plate includes a plate portion and a mezzanine portion. Secondly, the mezzanine portion is parallelly offset from the plate portion to form a containing space. After the mezzanine portion is parallelly offset, the initial position of the mezzanine portion becomes an opening on the plate portion, and then the containing space is formed between the opening and the mezzanine portion. A first slit is formed between a side of the mezzanine portion and a side of the plate portion corresponding to the containing space and communicates with the containing space. Finally, a slice-shaped circuit is inserted into the containing space through the first slit. After the inserting step, the slice-shaped circuit is disposed in the containing space, i.e., stays between the plate portion and the mezzanine portion.

BRIEF DESCRIPTION OF THE DRAWINGS

FIG. 4 is a cross-sectional view of the embodiment shown in FIG. 3a;

FIG. 8c is a cross-sectional view of the embodiment shown in FIG. 8a;

DETAILED DESCRIPTION OF THE PREFERRED EMBODIMENT

The present invention provides a backlight module, a base used therein, and a manufacturing method thereof. In a preferred embodiment, the backlight module is applied to liquid crystal display (LCD) devices. However, in other embodiments, the backlight module can be applied to computer keyboards, mobile phone keypads, billboards, and other devices in need of flat light source. Furthermore, the present invention further includes a LCD device with the backlight module. In a preferred embodiment, the LCD device of the invention includes a color LCD device. However, in other embodiments, the LCD device of the invention may include a monochrome LCD device. The LCD device mentioned above generally means the display devices utilizing LCD panels, including LCD televisions, personal computers, the LCD monitors of laptop computers, the LCD screens of mobile phones and digital cameras, etc.

Figure 1A:
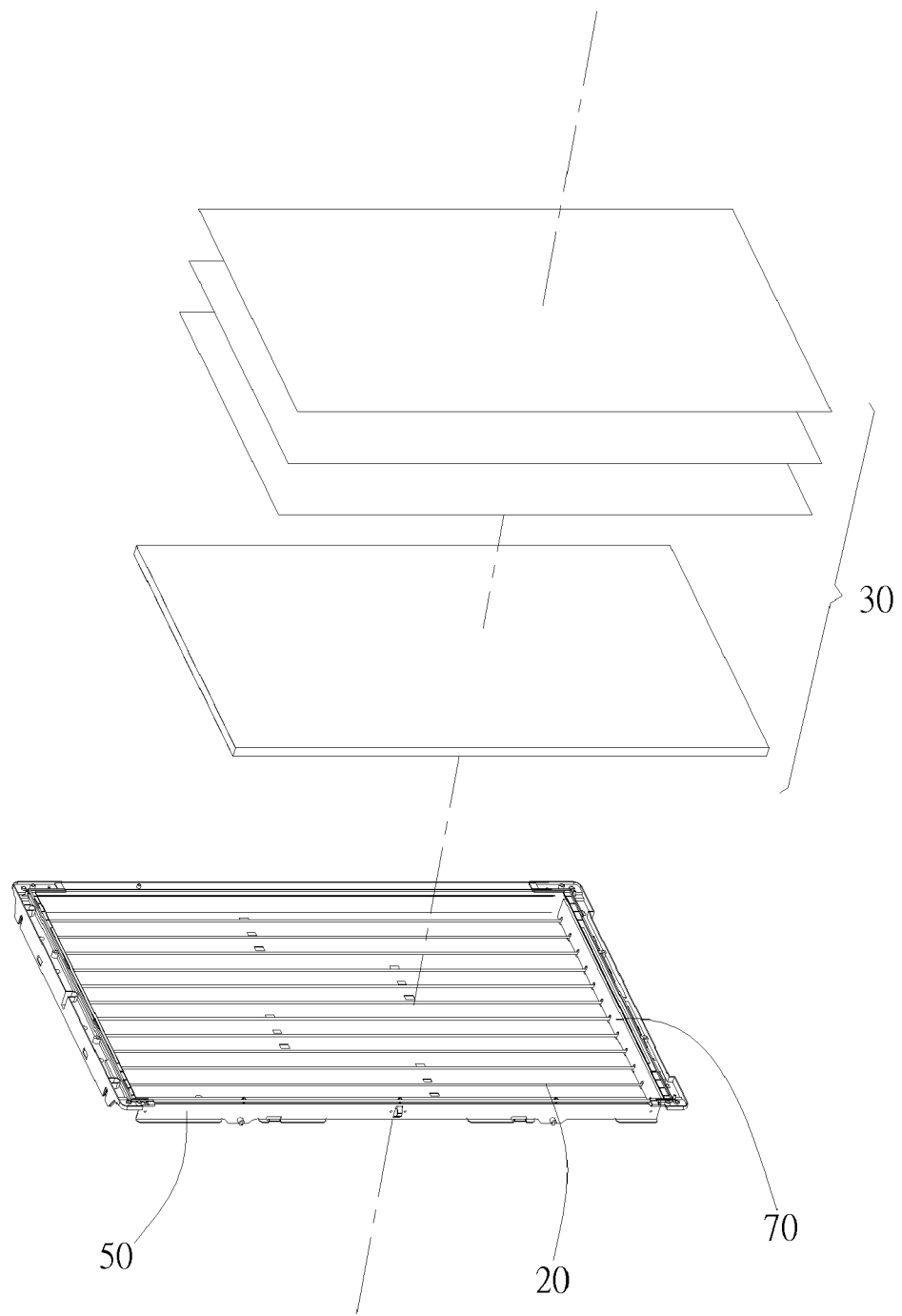
FIG. 1a and FIG. 1b are schematic views of a conventional backlight module.
Figure 1B:
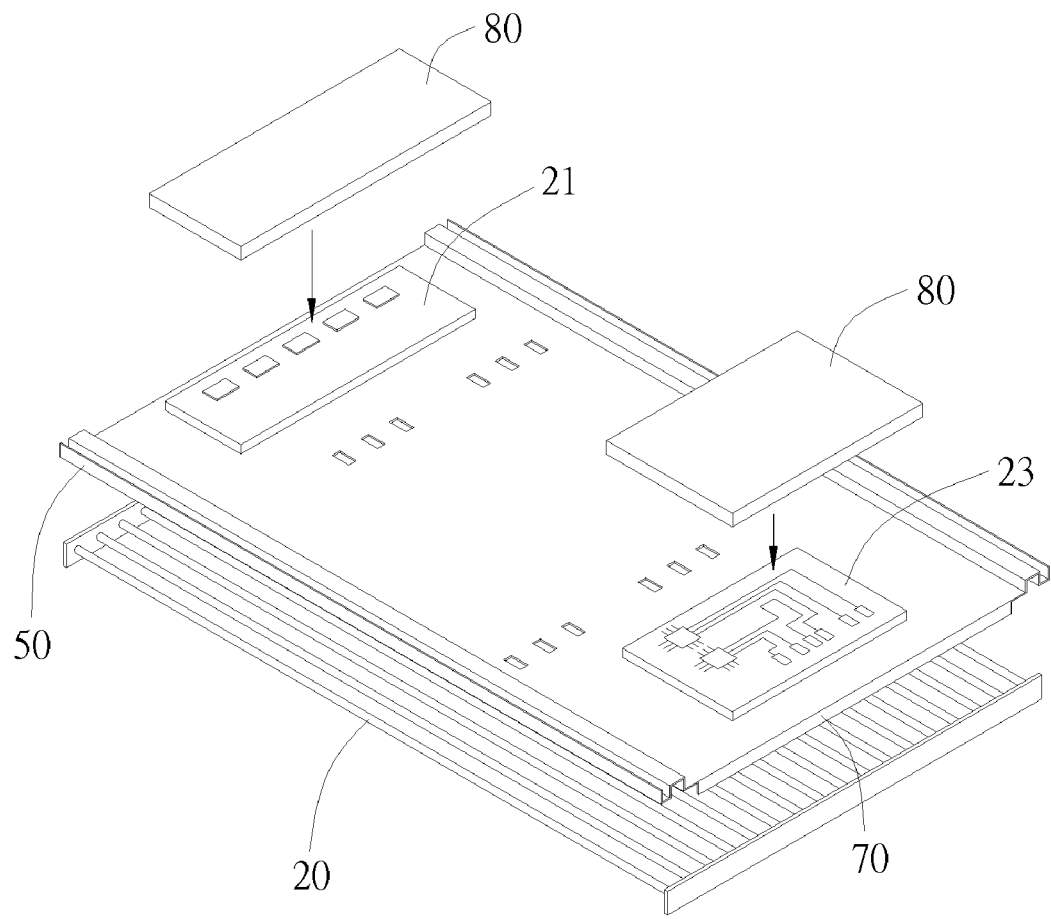
Figure 2:
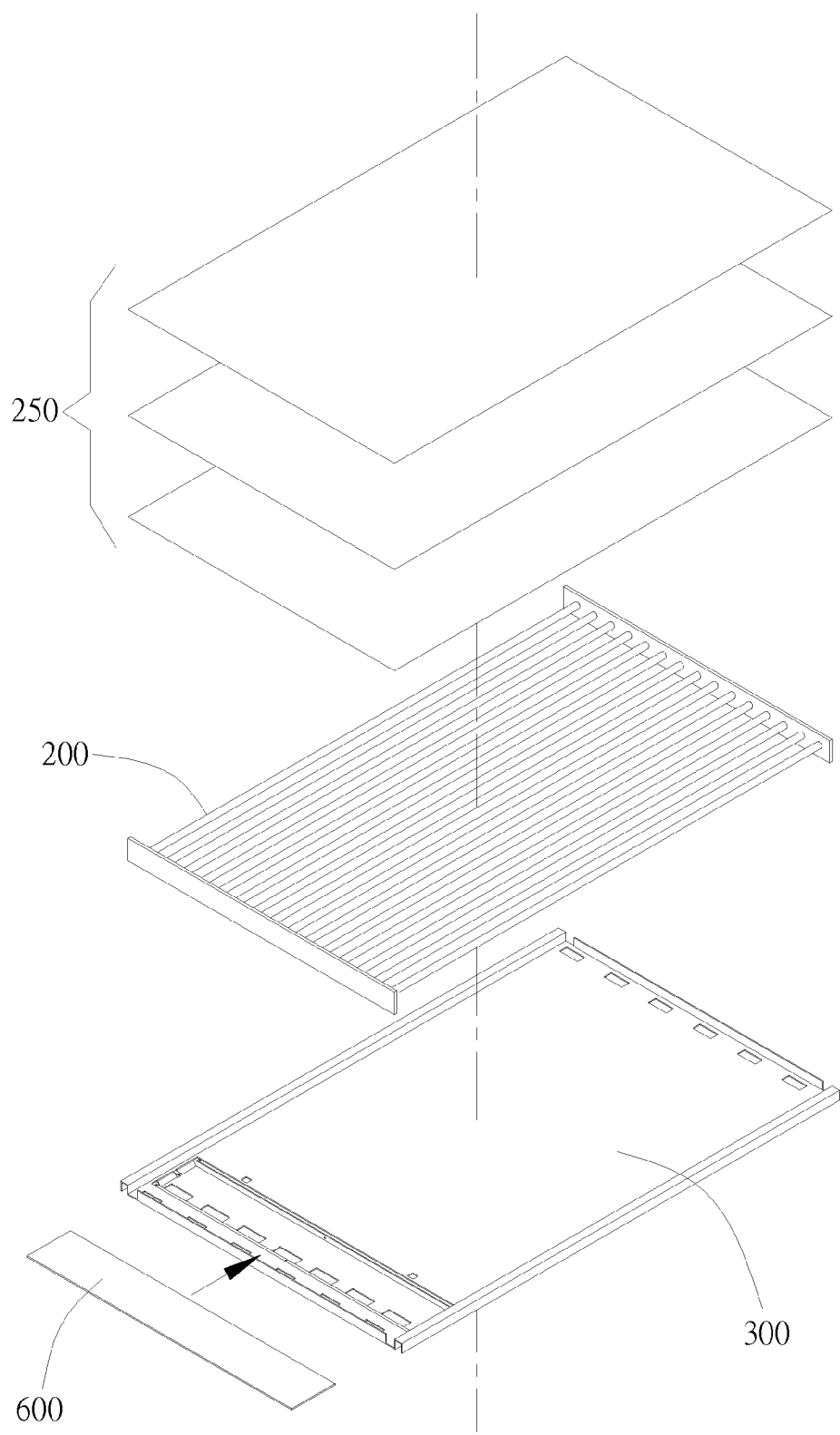
FIG. 2 is an explosive view showing components of a backlight module in accordance with one embodiment of the present invention.

As shown in FIG. 2, the backlight module of the invention includes a backlight module base 300 and a slice-shaped circuit 600. A light source device 200 is disposed on an inner side of the backlight module base 300. In this preferred embodiment, the light source device 200 is preferably composed of tube lamps. However, in other embodiments, the light source 200 can be composed of light emitting diodes (LEDs) or other suitable light emitting devices. Besides, various optical films 250 or plates, such as diffuser plates, diffuser films, polarizing films, or brightness enhancement films, can be provided on the light source device 200 to adjust the output light. The slice-shaped circuit 600 includes inverters, control circuits, or other circuit components.

Figure 3A:
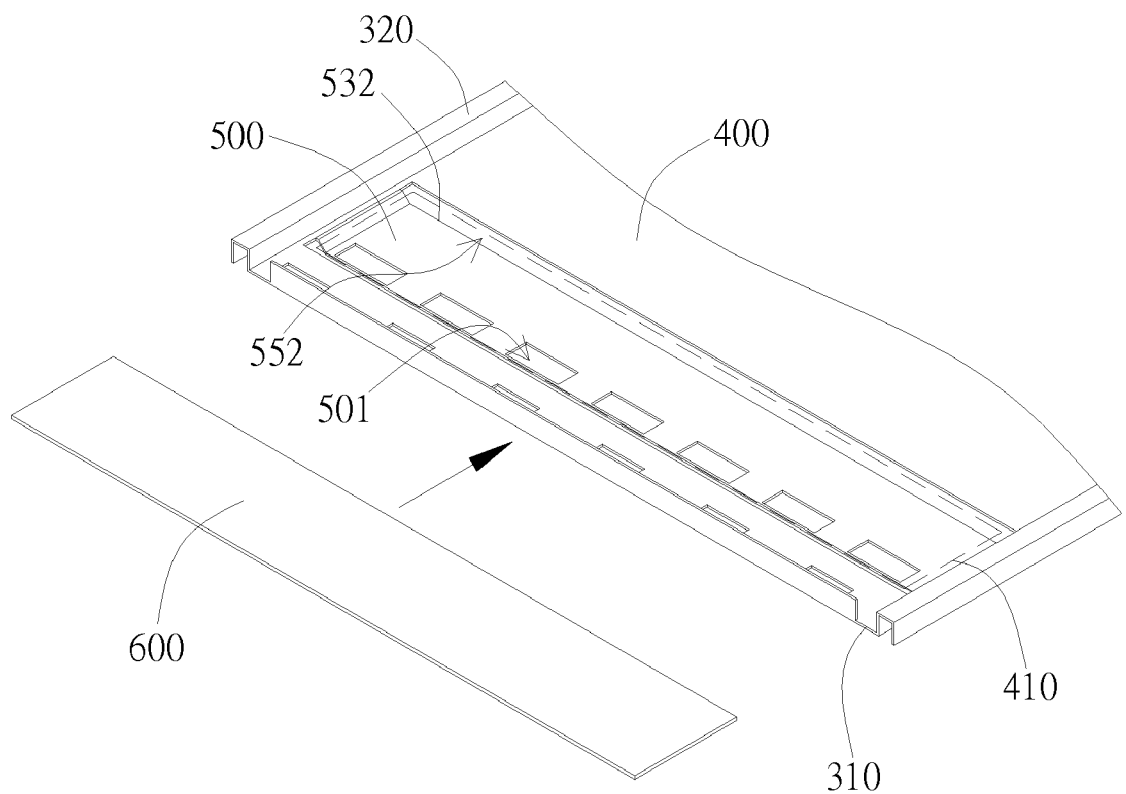
FIG. 3a is a schematic view of an embodiment of a backlight module base.
Figure 3B:
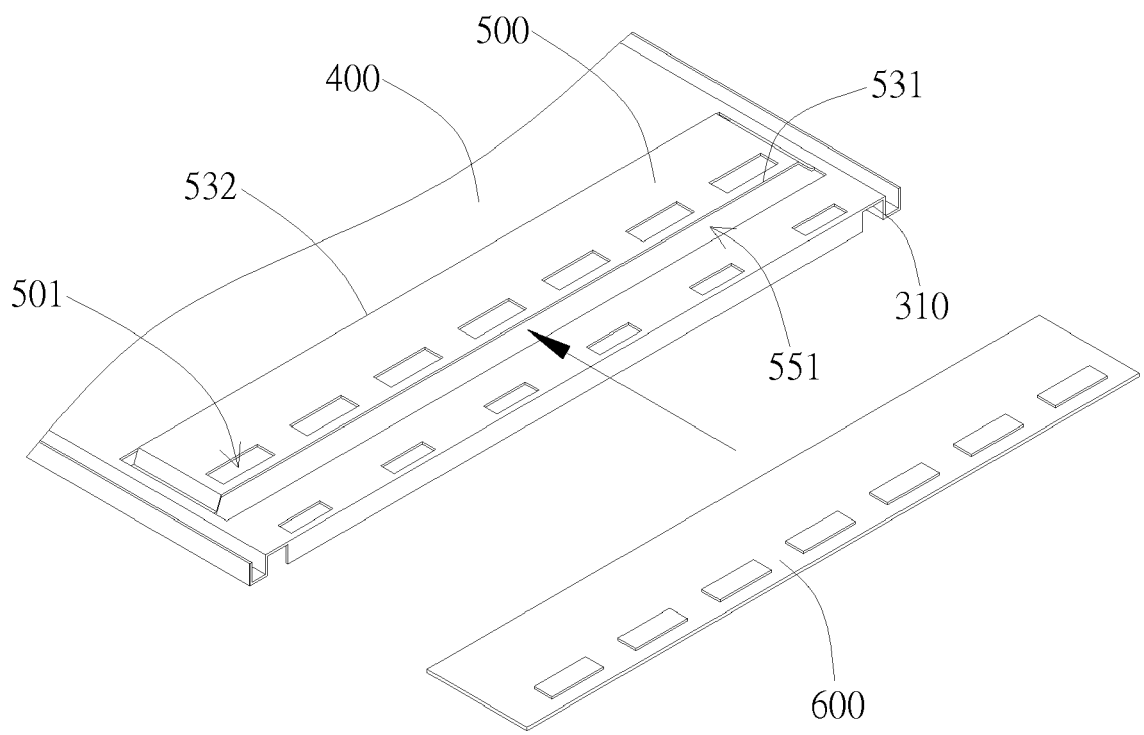
FIG. 3b is a schematic view of the embodiment shown in FIG. 3a from different viewing angle.

The backlight module base 300 is preferably made of metals such as galvanized steel plates, aluminum plates, stainless steel, or other metals or alloys. However, in other embodiments, the backlight module base 300 can be made of plastics or other materials. As shown in FIG. 3a and FIG. 3b, the backlight module base 300 includes a back plate 310 at the bottom and a sidewall 320 can be formed on the periphery of the back plate 310 in accordance with design requirements. The back plate 310 includes a plate portion 400 and a mezzanine portion 500. The light source device 200 is disposed on an inner side of the plate portion 400 and the other side of the plate portion 400 facing outward serves as a bottom surface of the backlight module. An opening 410 is formed on the plate portion 400 penetrating both inner and outer sides of the plate portion 400. The opening 410 is preferably formed near the shorter side of the plate portion 400. In a preferred embodiment, the opening 410 is formed by punching. However, other methods such as cutting can be adopted.

As shown in FIG. 3a and FIG. 3b, the mezzanine portion 500 is contained in the opening 410. In other words, the mezzanine portion 500 is within the projection area of the opening 410 on the plate portion 400. In this embodiment, the mezzanine portion 500 is a rectangular slice-shaped component. However, in other embodiments, the mezzanine portion 500 can be irregular or has other shapes. Furthermore, at least one hole 501 can be formed on the mezzanine portion 500 for components to be inserted thereinto. In some embodiments, the hole 501 can be provided to serve as a heat dissipation hole, to alleviate the weight, or to perform other functions.

Figure 4:
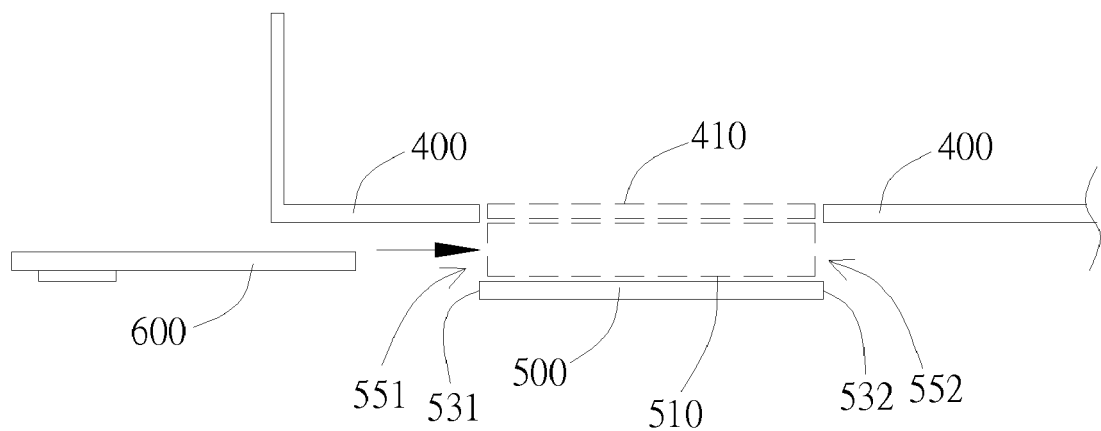

The mezzanine portion 500 is parallelly offset from the plate portion 400 to deviate from the plane of the plate portion 400, so that the initial position of the mezzanine plate 500 becomes the opening 410. As shown in FIG. 4, because the mezzanine portion 500 is parallelly offset form the plate portion 400, a containing space 510 is formed between an inner side of mezzanine 500 and the virtual plane of the plate portion 400. In a preferred embodiment, the mezzanine portion 500 is pushed out from the plane of the plate portion 400 to form an opening 410 by a punching process. However, in other embodiments, a process of cutting, injection, or molding can be adopted.

As shown in FIG. 3a, FIG. 3b, and FIG. 4, two opposite ends of the mezzanine portion 500 are respectively connected to the plate portion 400 on two sides of the opening 410. In this embodiment, two shorter sides of the mezzanine portion 500 are connected to the plate portion 400. However, in other embodiments, two longer sides of the mezzanine portion 500 can be connected to the plate portion 400. Moreover, in other embodiments, two adjacent sides of the mezzanine portion 500 can be connected to the plate portion 400 on two adjacent sides of the opening 410. Because the mezzanine portion 500 is preferably pushed out from the plate portion 400 by punching, the remaining portion between the plate portion 400 and the mezzanine portion 500 serves as the connection part after the punching process. In other words, the ends of the mezzanine portion 500 are connected to the plate portion 400 on the sides of the opening 410 in an integrated manner. However, the mezzanine portion 500 can be connected to plate portion 400 through add-on methods. For example, the mezzanine portion 500 can be connected to the plate portion 400 by soldering, screwing, or other suitable methods.

Figure 5:
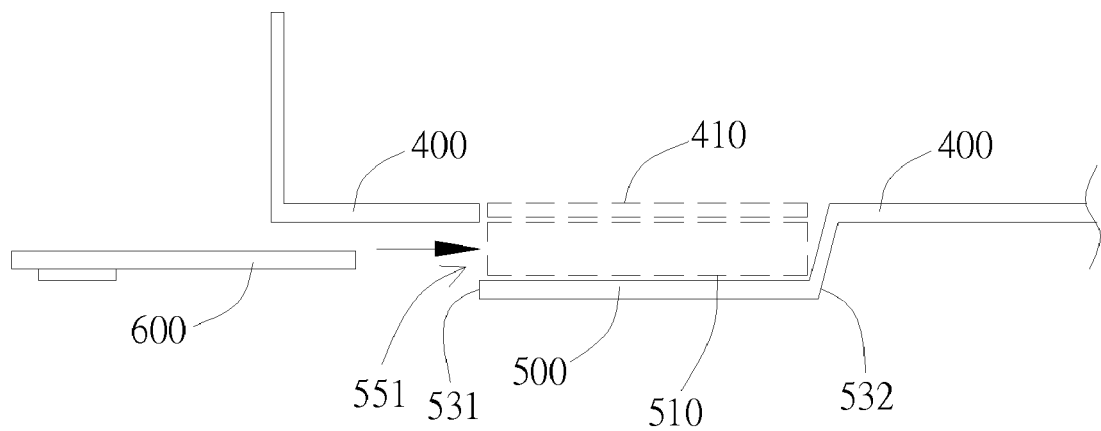
FIG. 5 is a schematic view of another embodiment of a backlight module base.

As shown in FIG. 3b and FIG. 4, two sides of the mezzanine portion 500 are respectively a first side 531 and a second side 532. The two sides 531 and 532 are both located between the two sides where the mezzanine portion 500 and the plate portion 400 are connected to each other. In other words, the two sides 531 and 532 are respectively adjacent to the two sides where the mezzanine portion 500 and the plate portion 400 are connected to each other. In this embodiment, the first side 531 and the second side 532 are two opposite longer sides of the mezzanine portion 500. However, in other embodiments, the first side 531 and the second side 532 can be two opposite shorter sides. Because the mezzanine portion 500 projects out from the plate portion 400, a first slit 551 is formed between the first side 531 and a side of the plate portion 400 corresponding to the opening 410. The first slit 551 communicates with the containing space 510 in the mezzanine portion 500. Furthermore, a second slit 552 is formed between the second side 532 and the other side of the plate portion 400 corresponding to the opening 410. The second slit 552 communicates with the containing space 510 which is inside the mezzanine portion 500 and also communicates with the first slip 551. However, in other embodiments, as shown in FIG. 5, the second side 532 can be connected to the plate portion 400 on the side of the opening 410; hence the second slit 552 is eliminated in this embodiment. In other words, the containing space 510 communicates with outside through the first slit 551.

In the embodiment as shown in FIG. 3a, FIG. 3b, and FIG. 4, the slice-shaped circuit 600 is inserted into the containing space 510 through the first slit 551 and stays between the plate portion 400 and the mezzanine portion 500. Particularly, the slice-shaped circuit 600 is disposed on the inner side of the mezzanine portion 500 and corresponds to the opening 410 on the plate portion 400. In a preferred embodiment, the slice-shaped circuit 600 is inserted but not to extend over the opening 410 into the inner side of the plate portion 400. However, in other embodiments, the slice-shaped circuit 600 can be inserted to partially extend over the opening 410 into the inner side of the plate portion 400. Furthermore, in this embodiment, the slice-shaped circuit 600 is not necessary to be inserted into the containing space 510 through the first slit 551. The slice-shaped circuit 600 can be inserted through the second slit 552. However, in the embodiment as shown in FIG. 5, because the second slid 552 is eliminated, the slice-shaped circuit 600 can only be inserted into the opening 410 of the plate portion 400 through the first slit 551.

Figure 6A:
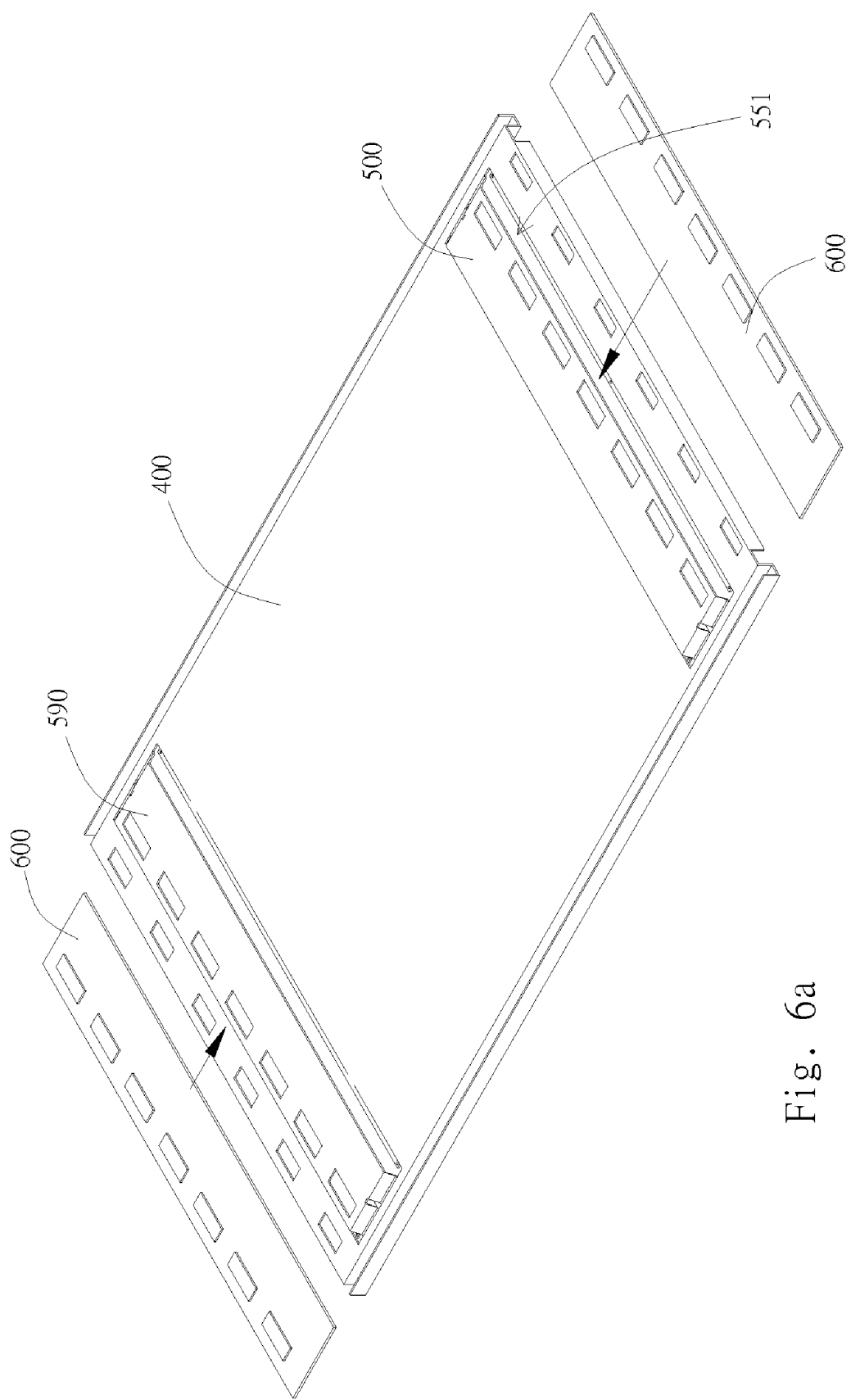
FIG. 6a is a schematic view of an embodiment of two opposite mezzanine portions.
Figure 6B:
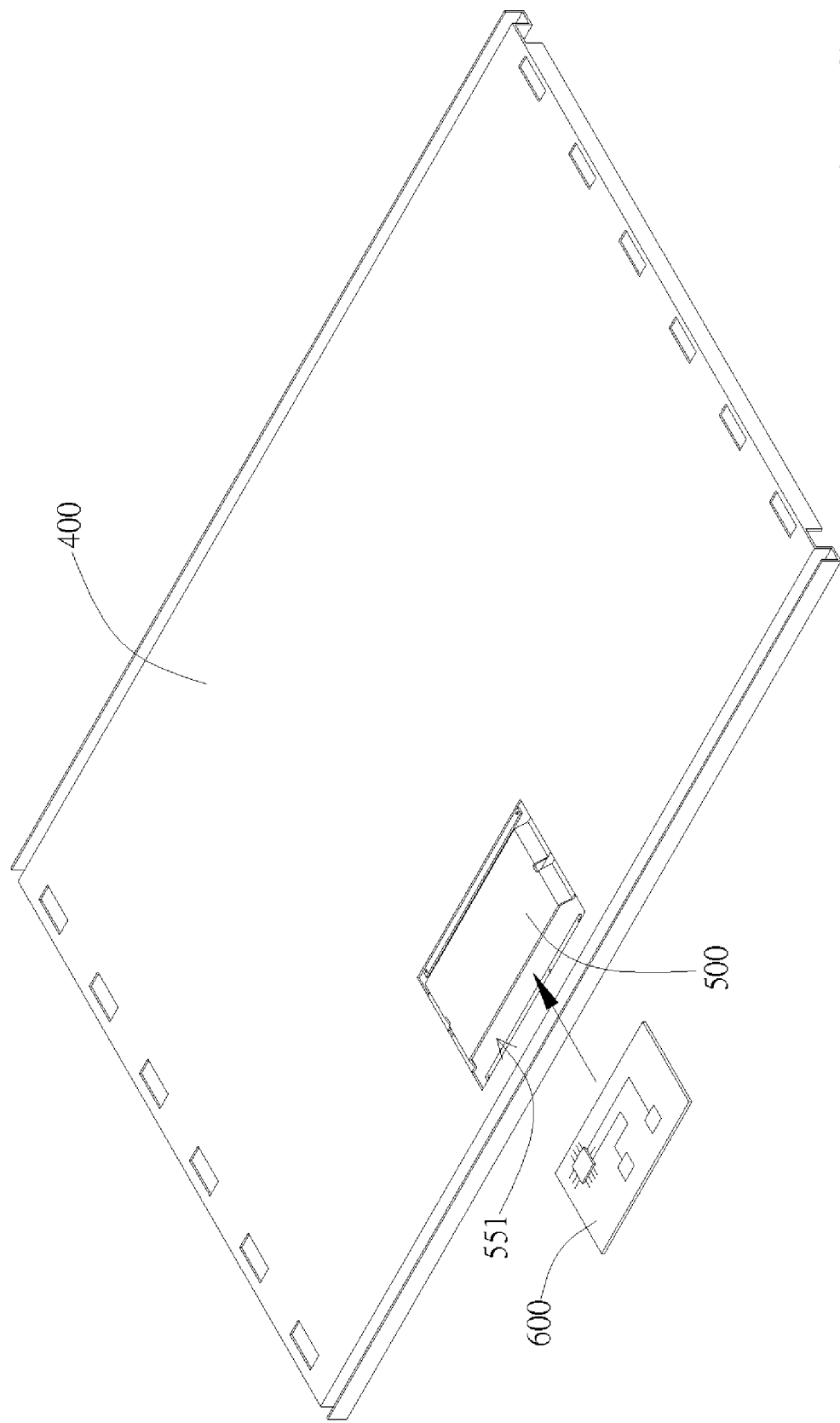
FIG. 6b is a schematic view of another embodiment of a mezzanine portion.

As shown in FIG. 3a, FIG. 3b, and FIG. 4, the mezzanine portion 500 is disposed near the shorter side of the plate portion 400. In this embodiment, because the shorter side of the plate portion 400 is closer to the power connection side of the light source device 200, the slice-shaped circuit 600 is preferably an inverter or other circuit components, so as to couple with the light source device 200. In the embodiment as shown in FIG. 6a, an additional mezzanine portion 590 can be disposed on the other side of the plate portion 400 opposite to the mezzanine portion 500. The additional mezzanine portion 590 can be disposed in a manner similar to that of the mezzanine portion 500 and may be different in shape, size, or manufacturing method in accordance with design requirements. Furthermore, in the embodiment as shown in FIG. 6b, the mezzanine portion 500 can be disposed near the longer side of the plate portion 400. In this embodiment, the slice-shaped circuit 600 inserted into the containing space 510 of the mezzanine portion 500 is preferably a control circuit or other components for controlling the backlight module or other modules.

Figure 7:
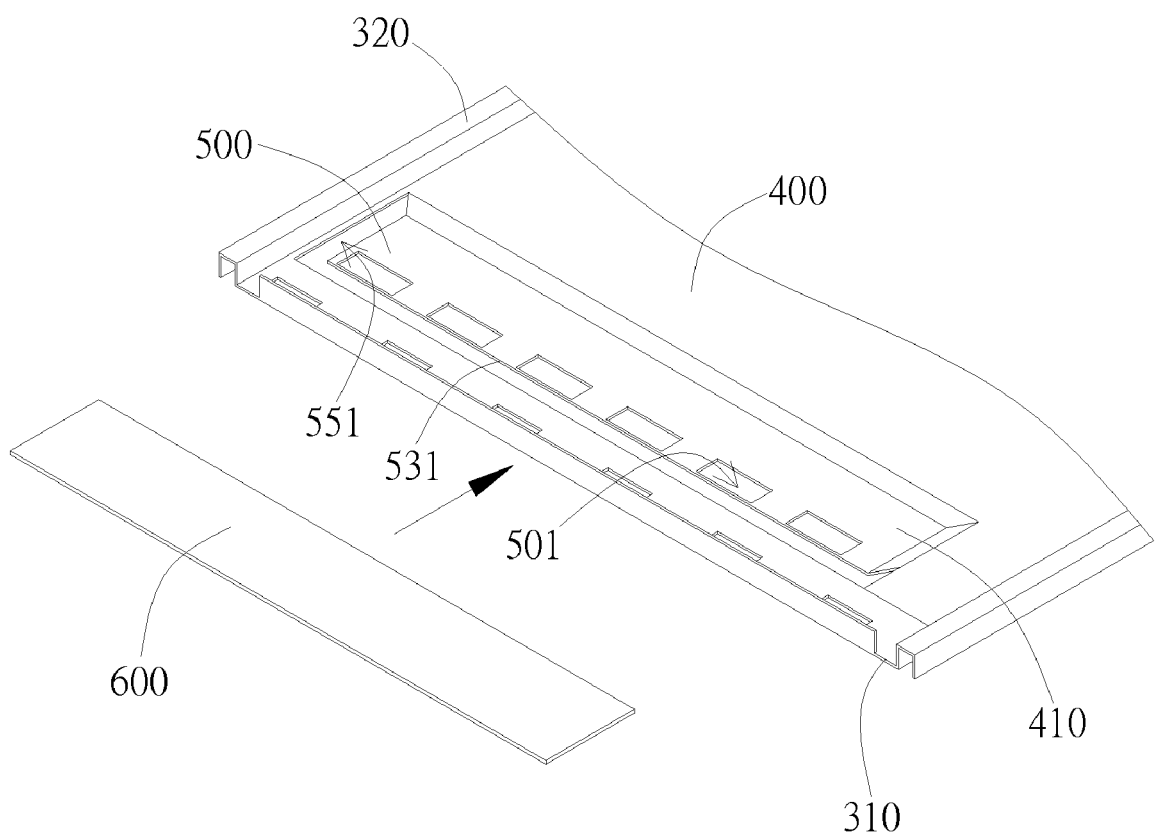
FIG. 7 is a schematic view of another embodiment of a mezzanine portion.

FIG. 7 illustrates another embodiment of the present invention. In this embodiment, two sides of the mezzanine portion 500 connected to the plate portion 400 are adjacent to each other and form an L shape. The mezzanine portion 500 has the first side 531 adjacent to at least one of the two connection sides described above. A first slit 551 is formed between the first side 531 and the side of the plate portion 400 corresponding to the opening 410 and communicates with the containing space 510. As shown in FIG. 7, the first slit 551 is also an L shape; hence the slice-shaped circuit 600 can be inserted into the containing space 510 through the first slit 551.

Figure 8A:
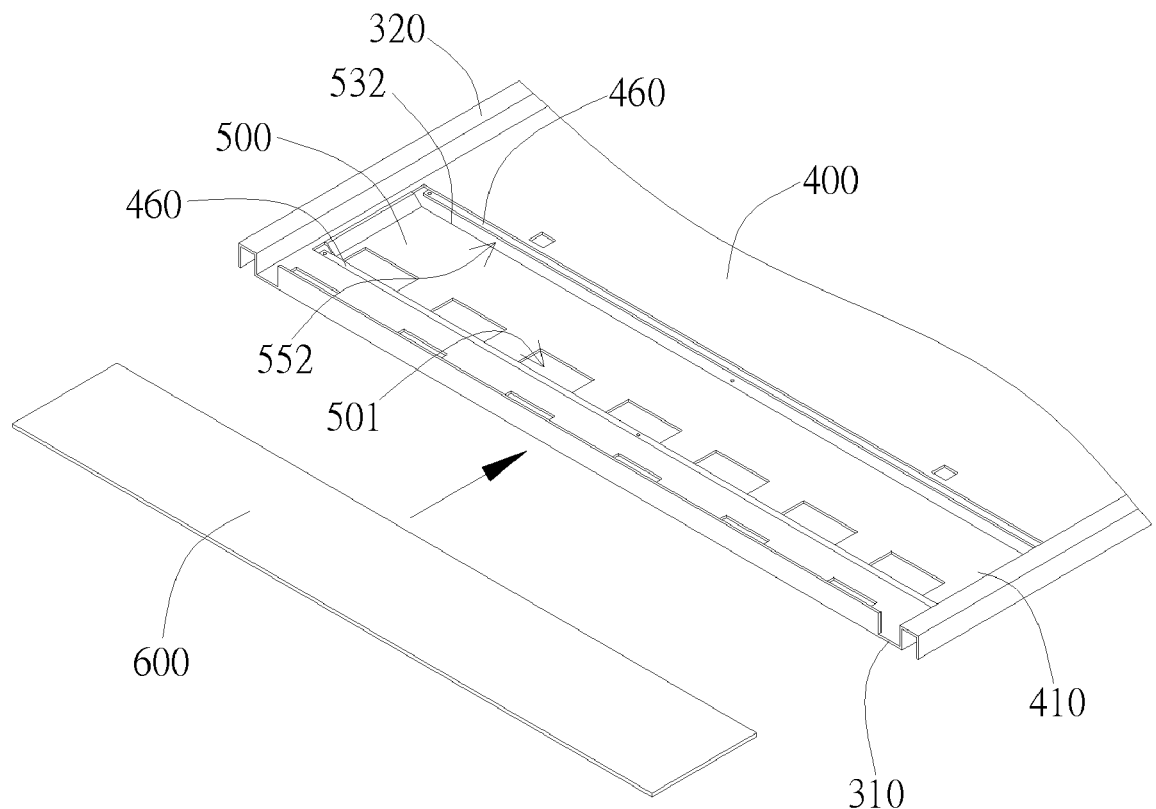
FIG. 8a is a schematic view of an embodiment having a locking unit and a first block portion.
Figure 8B:
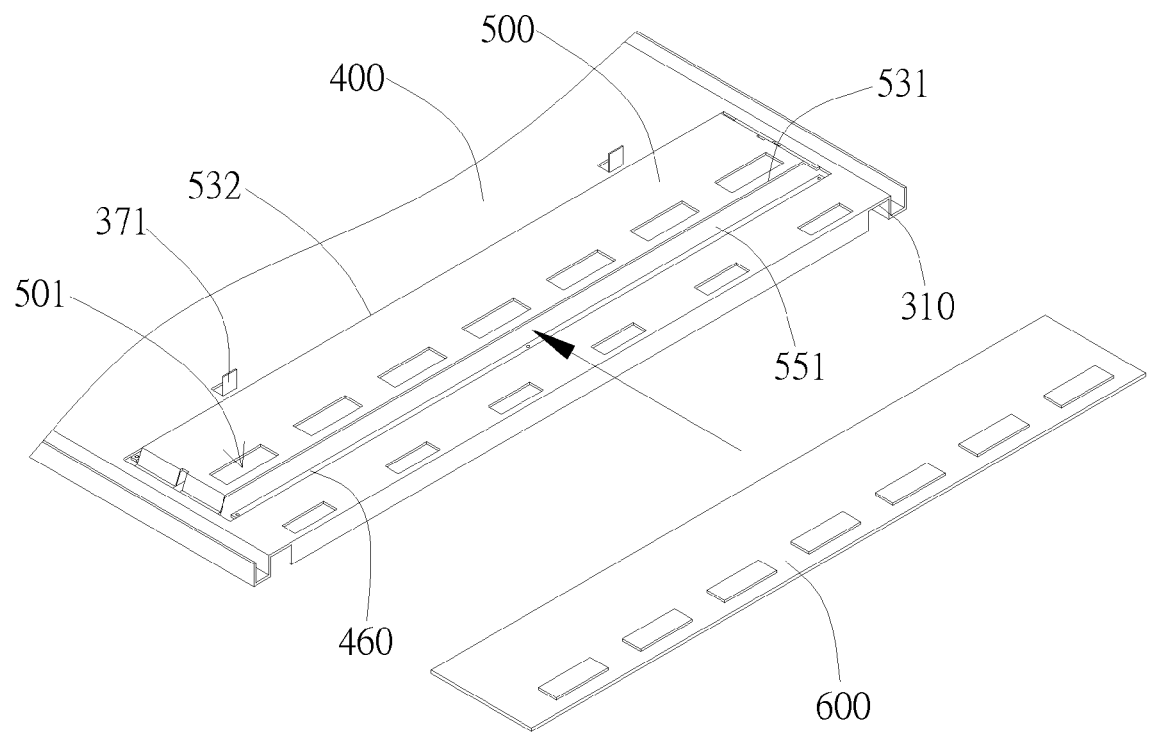
FIG. 8b is a schematic view of the embodiment shown in FIG. 8a from different viewing angle.
Figure 8C:
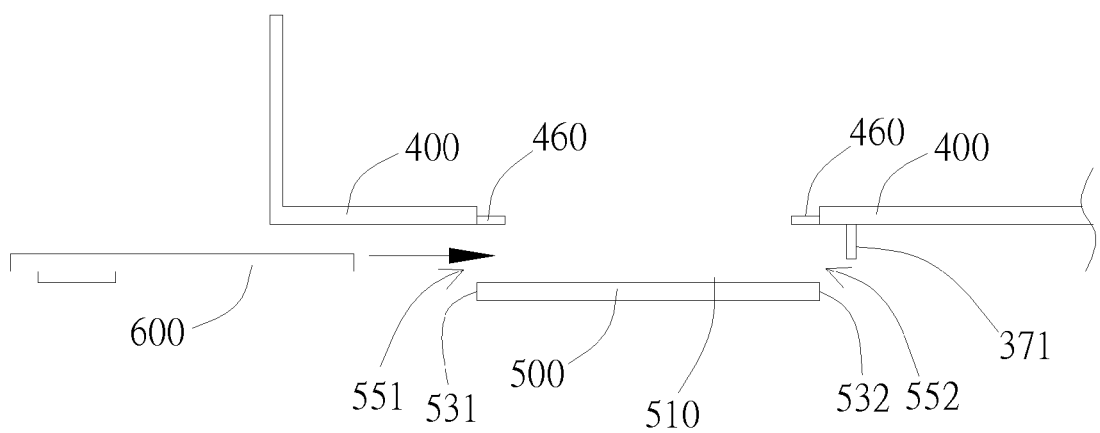

In the embodiment as shown in FIG. 8a, FIG. 8b, and FIG. 8c, locking units 460 are respectively disposed on the sides of the plate portion 400 corresponding to the first slit 551 and the second slit 552. After the slice-shaped circuit 600 is inserted into the containing space 510, the slice-shaped circuit 600 can be fixed on the plate portion 400 through the locking unit 460 and therefore, the movement of the slice-shaped circuit 600 with respect to the back plate 310 is restricted. The locking units 460 can be disposed on both sides of the plate portion 400 corresponding to the first slit 551 and the second slit 552; however, the locking unit 460 can be disposed on either one side. Moreover, in other embodiments, the locking unit 460 can be provided on the mezzanine portion 500 for fixing the slice-shaped circuit 600 on the mezzanine portion 500. In such a case, the locking unit 460 can be a hole formed in the mezzanine portion 500.

As shown in FIG. 8a, FIG. 8b, and FIG. 8c, the back plate 310 further includes a first block portion 371. The first block portion 371 is disposed on the plate portion 400 adjacent to the second slit 552; preferably, in front of the second slit 552. When the slice-shaped circuit 600 is inserted into the containing space 510 through the first slit 551, the slice-shaped circuit 600 extends toward the second slit 552. Before the slice-shaped circuit 600 extends out the containing space 510, one end of the slice-shaped circuit 600 will touch the first block portion 371 and the slice-shaped circuit 600 is blocked. Through the implementation of the first block portion 371, the slice-shaped circuit 600 can be prevented from sliding out the containing space 510 through the second slit 552 and the slice-shaped circuit 600 can be fixed in a proper position during assembling.

Figure 8D:
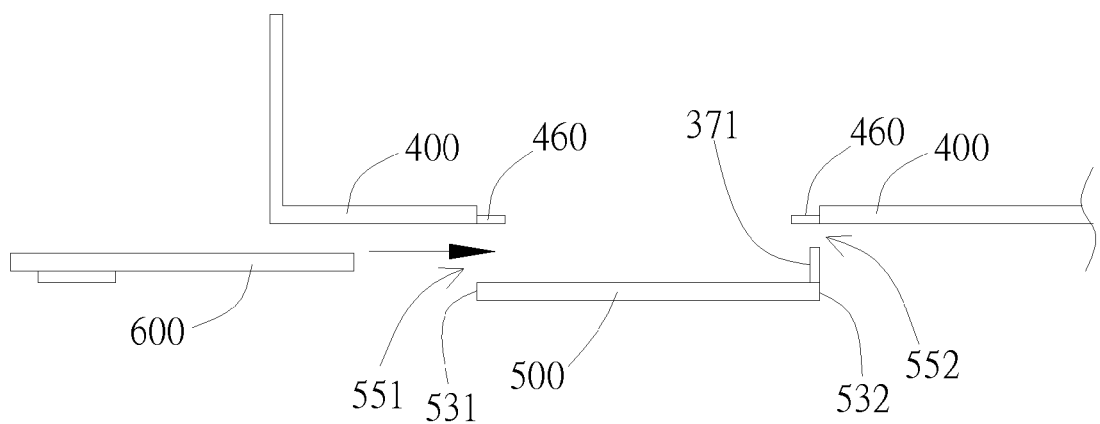
FIG. 8d is a schematic view of another embodiment of the first block portion.

In this embodiment, the first block portion 371 extends from the plate portion 400 in a direction that the mezzanine portion 500 is parallelly offset. In a preferred embodiment, the first block portion 371 is formed by punching a portion of the plate portion 400 at appropriate locations. As shown in FIG. 8a, the first block portion 371 is formed as a fin. One end of the first block portion 371 is connected to the plate portion 400 and the other end is bent outwardly after separated from the plate portion 400. However, in other embodiments, cutting or other add-on methods, such as screwing and soldering, can be adopted to connect the first block portion 371 to the plate portion 400. Furthermore, in the embodiment as shown in FIG. 8d, the first block portion 371 can be formed on the side of the mezzanine portion 500 corresponding to the second slit 552. In this embodiment, the first block portion 371 can also avoid the sliding out of the slice-shaped circuit 600 from the second slit 552.

Figure 9:
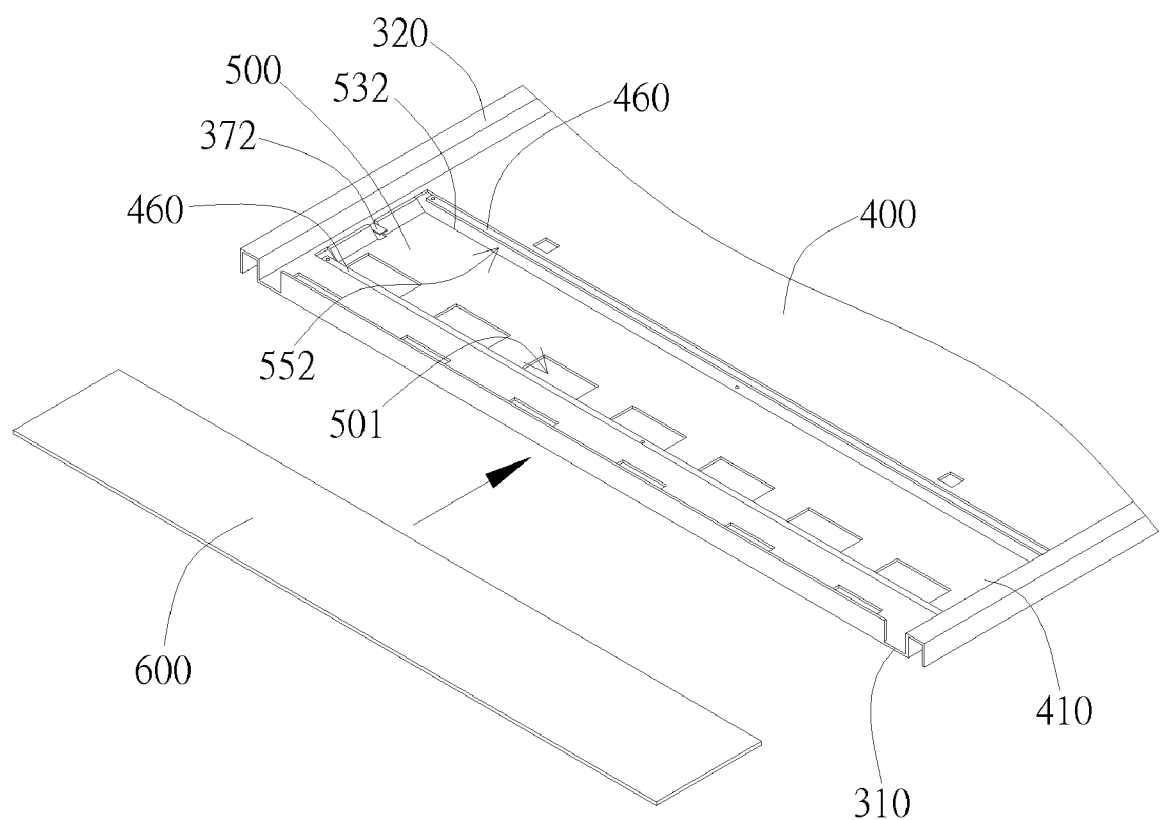
FIG. 9 is a schematic view of an embodiment having a second block portion.

In the embodiment as shown in FIG. 9, the back plate 310 further includes a second block portion 372. The second block portion 372 extends from the connection part of the plate portion 400 and the mezzanine portion 500 into the opening 410. In this embodiment, the second block portion 372 extends toward the opposite side of the opening 410. However, in other embodiments, the second block portion 372 can be disposed on the inner edges of the plate portion 400 with respect to the first slit 551 or the second slit 552 and extends into the opening 410. When the slice-shaped circuit 600 is inserted into the containing space 510 through the first slit 551, the slice-shaped circuit 600 is positioned between the mezzanine portion 500 and the second block portion 372. The second block portion 372 can fix the slice-shaped circuit 600 inside the containing space 510 and can serve as a guiding device when the slice-shaped circuit 600 is inserted into the containing space 510.

The second block portion 372 is preferably coplanar with the plate portion 400. However, in other embodiments, the second block portion 372 can slightly incline toward the mezzanine portion 500 and has an angle with respect to the plate portion 400 for providing more flexibility and feasibility to the slice-shaped circuit 600. In the embodiment as shown in FIG. 9, the second block portion 372 is formed as a fin. One end of the second block portion 372 connects to the plate portion 400 and the other end is bent inwardly after separated from the plate portion 400. In this embodiment, the second block portion 372 is formed by punching. However, in other embodiments, cutting or other add-on methods, such as screwing and soldering, can be adopted to connect the second block portion 372 to the plate portion 400.

Figure 10:
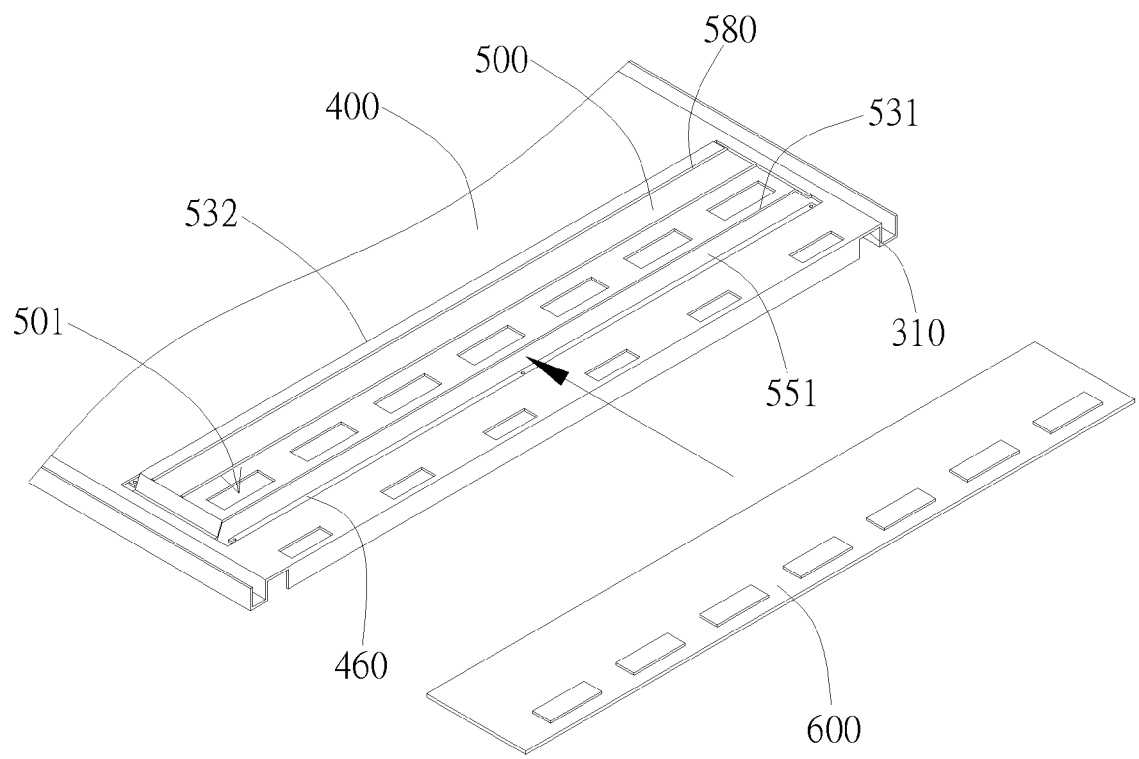
FIG. 10 is a schematic view of an embodiment including a rib.

In the embodiment as shown in FIG. 10, one or more ribs 580 can be formed on the mezzanine portion 500. In this embodiment, the rib 580 extends along the first slit 551 to increase the bending strength of the mezzanine portion 500 on the longer side. However, in other embodiments, the rib 580 can extends in a direction perpendicular to the first slit 551 to increase the bending strength of the mezzanine portion 500 on the shorter side. Furthermore, the mezzanine portion 500 can have multiple ribs 580 parallel to and perpendicular to the first slit 551 to form a matrix structure to increase the structural strength of the entire mezzanine portion 500.

Figure 11:
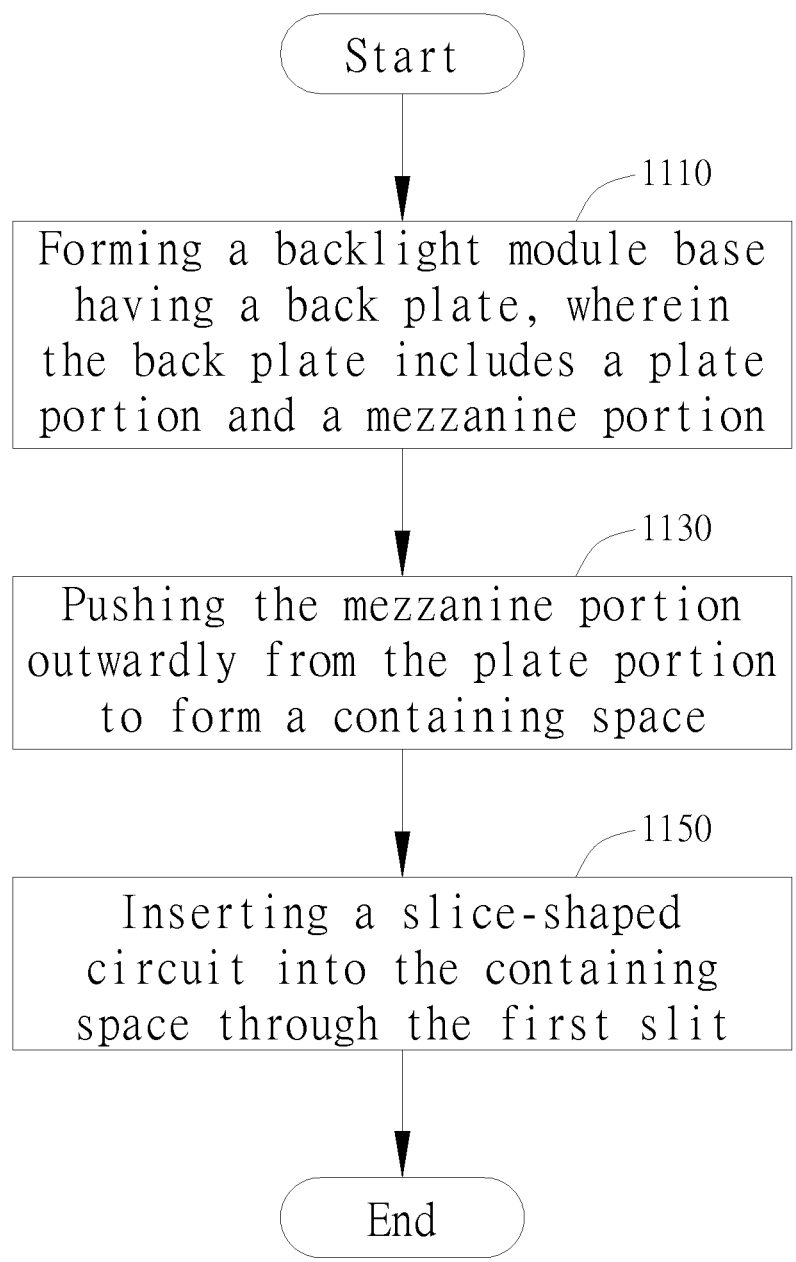
FIG. 11 is a flow chart of an exemplary method of manufacturing a backline module.

The present invention also provides a manufacturing method of a backlight module. In the embodiment as shown in FIG. 11, the method includes Step 1110, forming a backlight module base having a back plate, wherein the back plate includes a plate portion and a mezzanine portion. The back plate of the backlight module is preferably made of metallic materials and formed by press or other methods. The mezzanine portion of the back plate is preferably surrounded by the plate portion. During manufacturing, the mezzanine portion is preferably formed by punching to separate a portion of the mezzanine portion from the plate portion. However, in other embodiments, other methods such as cutting can be adopted. Taking a rectangular mezzanine portion as an example, it is preferably to cut the two opposite longer sides, so that two opposite shorter sides remain to be connected to the plate portion. Furthermore, it is possible to cut a longer side and an adjacent shorter side to form an L shape slit. Alternatively, only one side is cut and the other three sides remain in a connection manner.

Step 1130 includes pushing the mezzanine portion outwardly from the plate portion to form a containing space. In this step, the mezzanine portion is preferably parallelly offset from the plate portion 400 by punching or other methods, so that the mezzanine portion and the plate portion are respectively in two parallel planes. If the punching method is adopted, Step 1110 and Step 1130 can be performed simultaneously. After the mezzanine portion is pushed out, the initial position of the mezzanine plate 500 becomes an opening and a containing space is formed between the opening and the mezzanine portion. In a preferred embodiment, two opposite ends of the mezzanine portion are respectively connected to a portion of the plate portion corresponding to two opposite ends of the containing space, while the first side and the second side of the mezzanine portion which had been cut are separated form the plate portion. Meanwhile, a first slit is formed between an inner side of the plate portion corresponding to the containing space and the first side, and a second slit is formed between an inner side of the plate portion corresponding to the containing space and the second side. The first slit and the second slit respectively communicate with the containing space.

Step 1150 includes inserting a slice-shaped circuit into the containing space through the first slit. The slice-shaped circuit includes inverters, control circuits, or other circuit components. The inserting step can be performed manually or automatically. After the slice-shaped circuit is inserted, the slice-shaped circuit is within the containing space, i.e., stays between the plate portion and the mezzanine portion. Particularly, the slice-shaped circuit is located at the inner side of the mezzanine portion corresponding to the opening of the plate portion.

Figure 12:
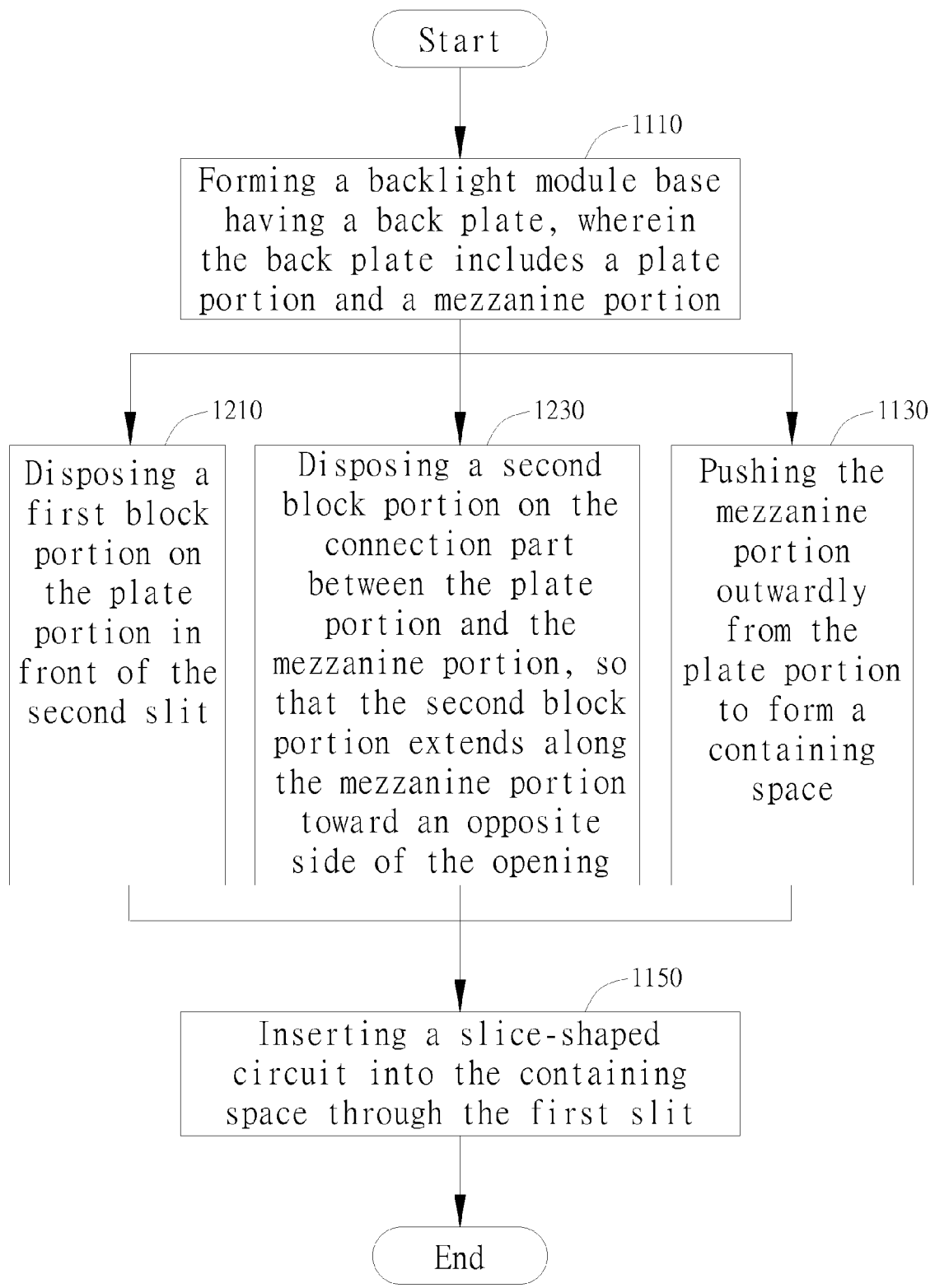
FIG. 12 is a flow chart of another exemplary method of manufacturing a backlight module.

In the embodiment as shown in FIG. 12, the method further includes Step 1210, wherein a first block portion is disposed on the plate portion in front of the second slit. The first block portion extends from the plate portion in a direction that the mezzanine portion is pushed out, preferably in a direction perpendicular to the plate portion. In a preferred embodiment, the first block portion is formed by punching the plate portion on an appropriate position. Meanwhile, the first block portion is formed as a fin. One end of the first block portion is connected to the plate portion and the other end is bent outwardly from the plate portion. However, in other embodiments, cutting or other add-on methods, such as screwing and soldering, can be adopted to connect the first block portion to the plate portion. In this embodiment, when the slice-shaped circuit is inserted into the containing space through the first slit, one end of the slice-shaped circuit will extend toward the second slit and touch the first block portion. Through the implementation of the first block portion, the slice-shaped circuit can be prevented from sliding out the containing space through the second slit and therefore, the slice-shaped circuit is fixed during assembling.

Step 1230 includes disposing a second block portion on the connection part between the plate portion and the mezzanine portion, so that the second block portion extends along the mezzanine portion toward an opposite side of the opening. In a preferred embodiment, the second block portion is formed by punching. However, in other embodiments, cutting or other add-on methods, such as screwing and soldering, can be adopted to connect the second block portion to the plate portion. The second block portion is preferably formed as a fin. One end of the second block portion connects to the plate portion and the other end is bent inwardly after separated from the plate portion. The second block portion is preferably coplanar with the plate portion. However, in other embodiments, the second block portion can slightly incline toward the mezzanine portion and has an angle with respect to the plate portion for providing more flexibility and feasibility to the slice-shaped circuit. In this embodiment, when the slice-shaped circuit is inserted into the containing space through the first slit, the slice-shaped circuit stays between the mezzanine portion and the second block portion. The second block portion can fix the slice-shaped circuit inside the containing space and serve as a guiding device when the slice-shaped circuit 600 is inserted into the containing space.

Although the present invention has been described through the above-mentioned related embodiments, the above-mentioned embodiments are merely the examples for practicing the present invention. What need to be indicated is that the disclosed embodiments are not intended to limit the scope of the present invention. On the contrary, the modifications within the essence and the scope of the claims and their equivalent dispositions are all contained in the scope of the present invention.

What is claimed is:

1. A backlight module base, comprising:
a back plate including a plate portion and a mezzanine portion, wherein an opening is formed on said plate portion, said mezzanine portion is contained in said opening and parallelly offset from said plate portion to form a containing space, at least one end of said mezzanine portion is connected to a portion of said plate portion corresponding to said opening, a first slit is formed between a first side of said mezzanine portion adjacent to said at least one end and a side of said plate portion corresponding to said opening and communicates with said containing space.

2. The backlight module base of claim 1, wherein a second side of said mezzanine portion opposite to said first side is connected to the other side of said plate portion opposite to said side.

3. The backlight module base of claim 1, wherein a second slit is formed between a second side of said mezzanine portion opposite to said first side and the other side of said plate portion opposite to said side and communicates with said containing space.

4. The backlight module base of claim 3, wherein said back plate further includes a first block portion, said first block portion is disposed on said plate portion in front of said second slit, and said first block portion extends form said plate portion in a direction that said mezzanine portion is parallelly offset.

5. The backlight module base of claim 4, wherein said first block portion includes a fin, one end of said fin is connected to said plate portion, and the other end of said fin is bent outwardly after separated from the plate portion.

6. The backlight module base of claim 3, wherein a locking unit is formed on a portion of said plate portion corresponding to said second slit.

7. The backlight module base of claim 1, wherein a locking unit is formed on a portion of said plate portion corresponding to said first slit.

8. The backlight module base of claim 1, wherein said back plate further includes a second block portion, said second block portion extends from the connection part of said plate portion and said mezzanine portion along said mezzanine toward the opposite side of said opening.

9. The backlight module base of claim 8, wherein said second block portion includes a fin, one end of said fin is connected to said plate portion, and the other end of said fin is bent inwardly after separated from the plate portion.

10. The backlight module base of claim 1, wherein said back plate further includes an additional mezzanine portion, and said mezzanine portion and said additional mezzanine portion are respectively disposed at two opposite ends of said plate portion.

11. The backlight module base of claim 1, wherein said mezzanine portion includes a rib.

12. The backlight module base of claim 1, wherein said mezzanine portion includes at least one heat dissipation hole.

13. The backlight module base of claim 1, wherein said mezzanine portion includes at least one locking unit.

14. An backlight module, comprising:
a backlight module base including a back plate, said back plate including a plate portion and a mezzanine portion, wherein an opening is formed on said plate portion, said mezzanine portion is contained in said opening and parallelly offset from said plate portion to form a containing space, at least one end of said mezzanine portion is connected to a portion of said plate portion corresponding to said opening, a first slit is formed between a first side of said mezzanine portion adjacent to said at least one end and a side of said plate portion corresponding to said opening and communicates with said containing space; and
a slice-shaped circuit inserted into said containing space through said first slit so that said slice-shaped circuit stays between said plate portion and said mezzanine portion.

15. The backlight module of claim 14, wherein a second side of said mezzanine portion opposite to said first side is connected to the other side of said plate portion opposite to said side.

16. The backlight module of claim 14, wherein a second slit is formed between a second side of said mezzanine portion opposite to said first side and the other side of said plate portion opposite to said side and communicates with said containing space.

17. The backlight module of claim 16, wherein said back plate further includes a first block portion, said first block portion is disposed on said plate portion in front of said second slit, said first block portion extends form said plate portion in a direction that said mezzanine portion is parallelly offset, and one side of said slice-shaped circuit touches said first block portion.

18. The backlight module of claim 17, wherein said first block portion includes a fin, one end of said fin is connected to said plate portion, and the other end of said fin is bent outwardly after separated from the plate portion.

19. The backlight module of claim 16, wherein a locking unit is formed on a portion of said plate portion corresponding to said second slit, said slice-shaped circuit is secured to said locking unit.

20. The backlight module of claim 14, wherein a locking unit is formed on a portion of said plate portion corresponding to said first slit, said slice-shaped circuit is secured to said locking unit.

21. The backlight module of claim 14, wherein said back plate further includes a second block portion, said second block portion extends from the connection part of said plate portion and said mezzanine portion along said mezzanine portion toward the opposite side of said opening, said slice-shaped circuit is disposed between said second block portion and said mezzanine portion, and a top surface of said slice-shaped circuit touches said second block portion.

22. The backlight module of claim 21, wherein said second block portion includes a fin, one end of said fin is connected to said plate portion, and the other end of said fin is bent inwardly after separated from the plate portion.

23. The backlight module of claim 14, wherein said back plate further includes an additional mezzanine portion, and said mezzanine portion and said additional mezzanine portion are respectively disposed at two opposite ends of said plate portion.

24. The backlight module of claim 14, wherein said mezzanine portion includes a rib.

25. The backlight module of claim 14, wherein said mezzanine portion includes at least one heat dissipation hole.

26. The backlight module of claim 14, wherein said mezzanine portion includes at least one locking unit.

27. A method for manufacturing a backlight module, comprising:
forming a backlight module base having a back plate, wherein said back plate includes a plate portion and a mezzanine portion;
parallelly offsetting said mezzanine portion from said plate portion to form a containing space, wherein at least one end of said mezzanine portion is connected to a portion of said plate portion corresponding to said containing space, a first slit is formed between a first side of said mezzanine portion adjacent to said at least one end and a side of said plate portion corresponding to said containing space; and
inserting a slice-shaped circuit into said containing space through said first slit.

28. The method of claim 27, wherein the step of parallelly offsetting said mezzanine portion comprises cutting said first side of said mezzanine portion to separate said mezzanine portion and said plate portion.

29. The method of claim 27, wherein the step of parallelly offsetting said mezzanine portion comprises punching said mezzanine portion.

30. The method of claim 27, wherein the step of parallelly offsetting said mezzanine portion comprises forming a second slit between a second side of said mezzanine portion opposite to said first side and the other side of said plate portion opposite to said side to communicate with said containing space.

31. The method of claim 30, further comprising disposing a first block portion on said plate portion in front of said second slit, wherein said first block portion extends from said plate portion in a direction that said mezzanine portion is parallelly offset, wherein the step of inserting said slice-shaped circuit comprises inserting said slice-shaped circuit so that one side of said slice-shaped circuit touches said first block portion.

32. The method of claim 31, wherein the step of disposing said first block portion comprises cutting a portion of said plate portion and outwardly bending said portion of said plate portion to form said first block portion.

33. The method of claim 27, further comprising disposing a second block portion, wherein said second block portion extends from the connection part of said plate portion and said mezzanine portion along said mezzanine portion toward the opposite side of said containing space, wherein the step of inserting said slice-shaped circuit comprises disposing said slice-shaped circuit between said second block portion and said mezzanine portion so that a top surface of said slice-shaped circuit touches said second block portion.

34. The method of claim 33, wherein the step of disposing said second block portion comprises cutting a portion of said plate portion and inwardly bending said portion of said plate portion to form said second block portion.

* * * * *